United States Patent [19]

Noel

[11] Patent Number: 5,345,447
[45] Date of Patent: Sep. 6, 1994

[54] SWITCHING HUB WHICH IMPLEMENTS A VIRTUAL BUS FOR INTERCONNECTING STATIONS ON A CSMA NETWORK

[75] Inventor: Chris R. Noel, Cambridge, Mass.

[73] Assignee: Bytex Corporation, Westborough, Mass.

[21] Appl. No.: 14,212

[22] Filed: Feb. 5, 1993

[51] Int. Cl.$^5$ .................... H04L 12/46; H04L 12/66
[52] U.S. Cl. .................................. 370/67; 370/85.3; 370/94.3; 370/85.13
[58] Field of Search ................. 370/60, 60.1, 67, 85.1, 370/85.2, 85.3, 85.4, 85.5, 85.9, 85.13, 85.14, 94.1, 94.2, 94.3

[56] References Cited

U.S. PATENT DOCUMENTS

| | | | |
|---|---|---|---|
| 4,710,769 | 12/1987 | Friedman et al. | 370/67 |
| 4,805,169 | 2/1989 | Van Asselt | 370/85.9 |
| 5,187,605 | 2/1993 | Shikata et al. | 370/85.3 |

OTHER PUBLICATIONS

AT&T Advance Data Sheet for T7202 Smart Hub Controller (SHC), 1991.
ANSI/IEEE Std 802.3 specification for Repeater Unit for 10 Mb/s Baseband Networks, 1992.
IEEE 802.3i-1990 Protocol specification for Twisted-Pair Medium Attachment Unit and Baseband Medium, Type 10BASE-T, 1990.
Advanced Micro Devices Am79C980 Integrated Multiport Repeater Specification, Jan. 1992.
National Semiconductor DP83950A Repeater Interface Controller Specification 1992.

*Primary Examiner*—Wellington Chin
*Attorney, Agent, or Firm*—Fish & Richardson

[57] ABSTRACT

An apparatus for interconnecting a plurality of segments each of which operates in accordance with a bus protocol specifying collision detection and propagation operations. The apparatus includes a switching mechanism including a backplane having P signal paths and P switch ports each with an input and an output. The input of each switch port is connected to a different one of the P signal paths and at each switch port it connects a selectable one or more of the P signal paths to the output for that switch port. The apparatus also includes a plurality of port circuits each connected to a different one of the ports of the switching mechanism. Each port circuit includes an interface to which one of the plurality of segments is connected and through which that port circuit receives a data signal from and transmits a data signal to the attached segment; an auto-partition state machine connected to the interface for that port circuit receiving the data signal from the segment connected to that port circuit's interface and generating therefrom a single output signal on the output line of that port circuit, the auto-partition state machine performing partitioning functions for that port circuit's segment; and a control state machine receiving a signal over the input for that port circuit and using that signal to implement the collision detection and propagation operations of the bus protocol for the segment connected to that port circuit.

15 Claims, 6 Drawing Sheets

SWITCHING HUB WHICH IMPLEMENTS A VIRTUAL BUS FOR INTERCONNECTING STATIONS ON A CSMA NETWORK

BACKGROUND OF THE INVENTION

Ethernet is a specific implementation of what is generally referred to as a Carrier Sense Multiple Access/-Collision Detection (CSMA/CD) protocol. In accordance with such protocols, only a single station is permitted to have access to the medium at any one time. A procedure is specified to resolve conflicts resulting from concurrent access attempts by multiple sources. For Ethernet, the details of this protocol are defined by the IEEE 802.3 specification.

In general, a CSMA/CD protocol operates as follows. Each station that wants to send data over the network, attempts to access the network by transmitting a carrier signal over the network and waits to hear if any other station is also requesting access. Because the signal travels over the network only at a finite speed, the transmitted carrier signal from a first station will take a time T to reach a second station on the network. If the second station attempts to access the network after the first station has asserted its carrier signal on the network but before that signal has reached the second station, the second station will also send its carrier signal over the network. A "collision" will then occur between the two access signals. A collision is simply defined as a condition that results from concurrent transmissions from multiple signal sources. If the second station begins its transmission just prior to the time T, it will become aware of the collision almost immediately. The first station, however, will have to wait another T seconds (i.e., 2T) before it recognizes that a collision has occurred. If a station that is trying to transmit over the network detects a collision, it ceases transmission and waits a random amount of time before again attempting to send its data. Since each station waits a random amount of time before retrying, it is likely that the collision will not occur the next time.

If no other station also wants to send its data at the same time that the first station is trying to send its data, then no collisions will occur and the first station will be allowed to send its data. All other stations will recognize that the network is being used and they will not attempt to access the network until it again becomes quiet.

Typically only a limited number of stations or ports can be supported on a single network segment. However, the IEEE 802.3 specification defines a repeater unit that can be used to expand the number of ports that can operate on the network beyond this limited number. The repeater provides a way of interconnecting multiple segments. By using multiple repeater units the size of the network can be increased significantly. Conventionally, one way others have interconnected multiple repeater units is by way of a synchronous expansion bus (SEB) to which the multiple repeaters are connected. Each repeater unit converts the signal which it receives from a port station (typically a Manchester-encoded signal) into a set of bus signals which conform to some synchronous bus protocol. The bus protocols are typically proprietary to the particular company but they all require expanding the single Manchester-encoded signal to multiple signals requiring from 6 to 10 lines on the SEB. Typically, there will be a clock signal, a data signal, an enable signal and several lines for the collision detection and propagation protocol. Thus, in such systems, each network has its own multi-line bus. Switching a repeater unit from one expanded network to another requires disconnecting the multi-line outputs and inputs of the repeater unit from one SEB and reconnecting them to the other SEB.

SUMMARY OF THE INVENTION

In general, in one aspect, the invention features an apparatus for interconnecting a plurality of network segments each of which operates in accordance with a bus protocol specifying collision detection and propagation operations. The apparatus includes a switching mechanism including a backplane having P signal paths (each for carrying a single signal) and including P switch ports each with an input and an output. The input of each switch port is connected to a different one of the P signal paths. The switching mechanism operates to electrically connect at each switch port a selectable one or more of the P signal paths to the output for that switch port. The apparatus also includes a plurality of port circuits each connected to a different one of the ports of the switching mechanism. Each port circuit has an output connected to the input of the port to which it is connected and each has an input connected to the output of the port to which it is connected. Each port circuit includes an interface to which one of the plurality of segments is connected and through which that port circuit receives a data signal from and transmits a data signal to the attached segment; and an auto-partition state machine connected to the interface for that port circuit receiving the data signal from the segment connected to that port circuit's interface and generating therefrom a single output signal on the output line of that port circuit. The auto-partition state machine performs partitioning functions for that port circuit's segment. Each port circuit also includes a control state machine receiving a signal over the input for that port circuit and using that signal to implement the collision detection and propagation operations of the bus protocol for the segment connected to that port circuit.

Preferred embodiments include the following features. For each port circuit, the data signals received from and transmitted to the attached segment are Manchester-encoded signals. The single output signal generated by each auto-partition state machine is a single line signal, which is also a Manchester-encoded signal. The switching mechanism further includes a combiner circuit for each switch port. The combiner circuits combine all signals received over the signal paths that are electrically connected to the output of the associated switch port and perform an OR'ing function on those signals. In the case that output signal generated by each auto-partition state machine is a Manchester-encoded signal, each control state machine detects the occurrence of a collision by checking for a Manchester violation in the OR'd signal from the combiner circuit for that switch port. The bus protocol is a Carrier Sense Multiple Access (CSMA) protocol and the control state machines implement the collision detection and propagation algorithms of the CSMA protocol and the auto-partition state machines implement the auto-partition functions of the IEEE 802.3 specification.

Also in preferred embodiments, each of said P signal paths is a single line on said backplane. The output of each switch port includes a plurality of output signal lines each for carrying a different switch selected signal.

The control state machine in each port circuit includes a plurality of activity detectors each monitoring a different one of the plurality of signal output lines of the switch output to which that port circuit is connected. Each of the activity detectors indicates whether a signal is present on the associated signal output line for that switch port. The control state machine in each port circuit implements the collision propagation algorithm of the CSMA if more than one activity detector in that control state machine indicates an active signal line. In particular, the control state machine generates a jam signal if more than one activity detector in that control state machine indicates an active signal line.

In general, in another aspect, the invention features an apparatus for interconnecting a plurality of segments each of which operates in accordance with either a bus protocol specifying collision detection and propagation operations or a ring protocol. The apparatus includes a switching mechanism including a backplane having P signal paths (each carrying a single signal) and including P switch ports, each with an input and an output. The input of each switch port is connected to a different one of the P signal paths. The switching mechanism operates by electrically connecting at each switch port a selectable one or more of the P signal paths to the output for that switch port. The apparatus also includes a plurality of dual function port circuits for connecting a segment to the switching mechanism. Each of the dual function ports connects to a different one of the ports of the switching mechanism. Each dual function port circuit has an output connected to the input of the port to which it is connected and each has an input connected to the output of the port to which it is connected. Each of the dual function port circuits implements the functionality of either the bus protocol or the ring protocol depending upon which type of segment is connected to that dual function port circuit. For any given switch port on the switching mechanism, the switching mechanism connects only one of the P signal paths to the output of that switch port if the dual function port circuit connected thereto is implementing the functionality of the ring protocol and the switching mechanism connects more than one of said P signal paths to the output of that switch port if the dual function port circuit connected thereto is implementing the functionality of the bus protocol.

Per port switching capability has been developed for token ring networks. With the present invention, the per port switching technology can be efficiently and effectively extended to ethernet and other networks as well.

Under the conventional approach to ethernet network expansion (i.e. using an SEB), a very large bus would have been necessary to provide per port switching capability on and between multiple ethernet networks supported within a central hub. There would have to be an individual multi-line bus for each ethernet network that the hub supported. With the invention described herein, however, the per port switching technology that is currently being used to provide such switching capability in token ring networks can easily be extended to support other network protocols including not only the ring networks but also bus networks such as ethernet and star networks.

Other advantages and features will become apparent from the following description of the preferred embodiment and from the claims.

DESCRIPTION OF THE PREFERRED EMBODIMENTS

Figure 1:
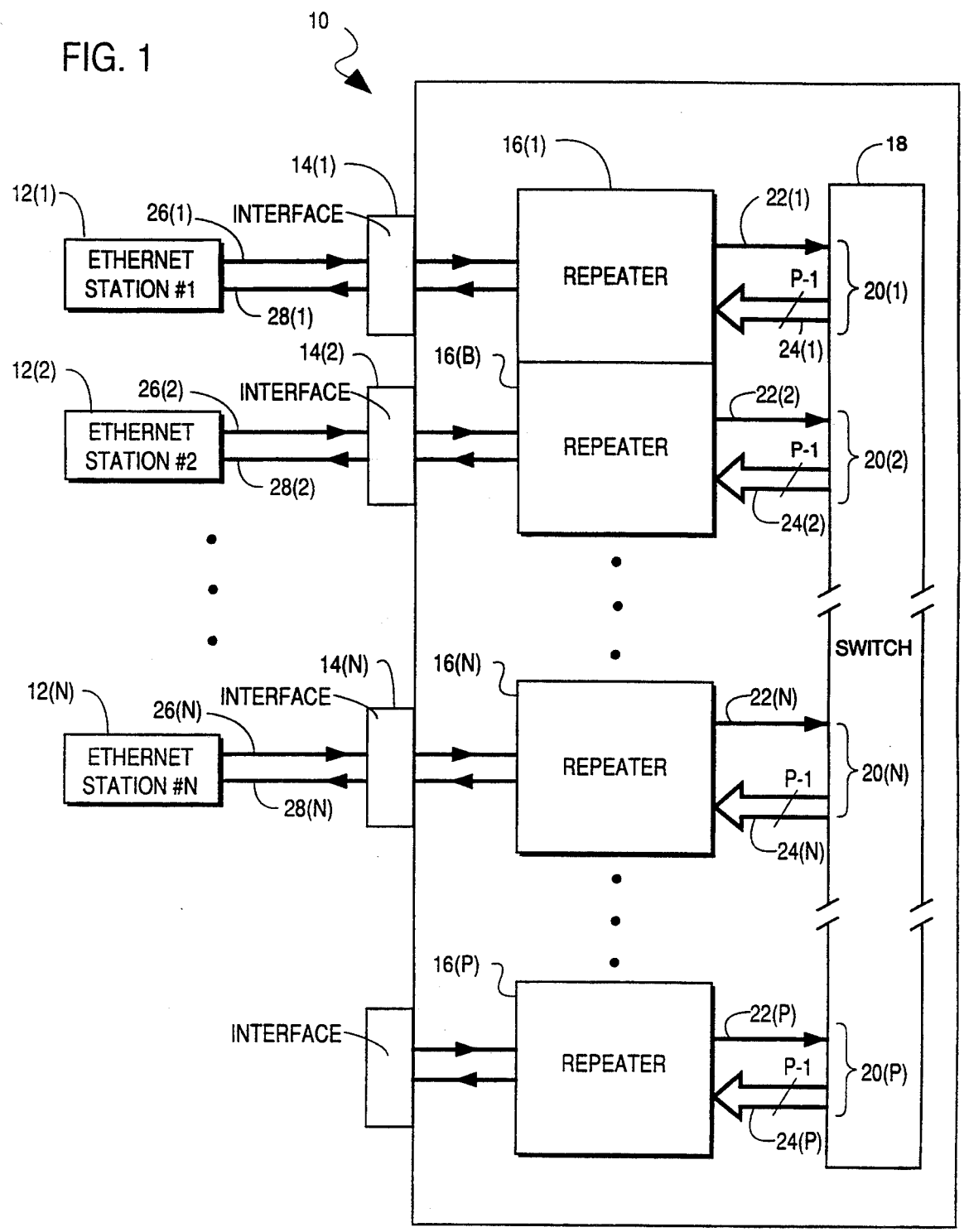
FIG. 1 is a schematic representation of an Ethernet network that embodies the invention.

Referring to FIG. 1, an ethernet hub 10 for interconnecting N stations 12(1)-12(N), also known as Data Terminal Equipment (DTE), includes P port interfaces 14(1)-14(P), each of which is connected to a repeater 16(1)-16(P) inside of hub 10. The DTE's are connected to port interfaces 14($i$) via segments. Though FIG. 1 shows only one DTE per segment, there may of course be multiple DTE's on any given segment.

Each repeater 16($i$) receives a signal from its port interface 14($i$) and, after appropriate processing as specified by the relevant communication specification, passes the received signal on to a hub switch 18 for distribution to the other DTE's 12 that are on that network. The connection of a repeater 16 to hub switch 18 is through an associated one of P switch ports 20(1)-20(P). In the described embodiment, each switch port 20 includes an input line 22($i$) for receiving a signal from the attached repeater and it includes P-1 output lines 24($i$) for transmitting signals from the other P-1 ports on the switch to the attached repeater 16($i$).

Hub switch 18 operates by creating a virtual bus for each network that is implemented within hub 10. Within the switching fabric no two ethernet stations use the same data lines to send data to another station, thus no actual collisions of signals occur on the data lines of the switch. However, two or more lines within the switching fabric may each simultaneously carry a data signal from a different DTE. Each repeater 16 looks at the traffic over all relevant signal lines coming out of the switch and determines whether two or more DTE's are attempting to simultaneously send data. If they are, the repeater detects a collision to have occurred and sends a jam signal to its DTE. In other words, no collision detection is performed in the switching fabric but rather it is performed by each repeater in the network on signals coming off of the switching fabric.

The switch is a space switch capable of electrically connecting any given input line 22($i$) to the output lines 24($i$) of any one or more of the other switch ports 20($i$) of switch 18. Equivalently, at any given switch port 20($m$), switch 18 can electrically couple input signals from any one or more other switch ports 20($i$) to the output lines 24($m$) of that port. Thus, for example, if all of the N stations shown in FIG. 1 are part of a single network, then switch 18 can be configured so that each repeater 16($i$) receives signals from all of the other N-1 repeaters and each repeater 16($i$) sends its output signals to all of the other N-1 repeaters.

In the described embodiment, the segments (each made up of input and output signals lines 26($i$) and 28($i$), respectively) over which the DTE's send data to and receive data from corresponding port interfaces 14(i) are twisted pair lines and the signals are Manchester-encoded signals. Each port interface 14(i) provides filtering, equalization and other functions in accordance with the IEEE 802.3 specification. Thus, each port interface circuit 14(i) contains an self-interrupt capability, referred to as the jabber function, that prevents an illegally long transmission by a DTE from permanently disrupting transmission on the network. The port interface 14(i) also tests link integrity. If the link integrity test fails, the port interface disables the transmit, receive and loopback functions for that port circuit. The port interface 14(i) provides electrical isolation between the DTE physical layer circuits and it provides transfer characteristics that meet the IEEE specification, including providing input/output impedance, output timing jitter, and differential output voltage that are within accepted tolerances. It also provides a receive function that complies with another set of electrical specifications.

Each repeater 16(i) processes the signals received from switch 18 and passes a single Manchester-encoded signal back to the DTE 12(i) connected to its port interface circuit. In accordance with one aspect of the invention, each repeater 16(i) implements a global collision detection algorithm on the signals received from its connection to switch 18. This means that a global collision detection logic is duplicated for every port circuit, i.e., for every port. Each repeater 16(i) implements the collision detection and propagation algorithm in accordance with the requirements of the relevant communications protocol (e.g. IEEE 802.3). In general for an Ethernet network, this means that if only one output line 24(i) to repeater 16(i) from switch 18 is active, the data signal received over the active line is passed through to the attached DTE 12(i). On the other hand, if more than one output line 24(i) to repeater 16(i) from switch 18 is active, repeater 16(i) sends a jam signal to the attached DTE. Upon receiving the jam signal, if the attached DTE was one of the stations seeking access to the network, it backs off on its attempt to send data, waits a random amount of time and tries again, assuming that the network has not been acquired by another station before then. If the attached DTE was not attempting to send data at the time it receives the jam signal, it simply recognizes the jam signal as an indication that other stations are using the network and will not attempt to send any data until the network again becomes silent for a predetermined period of time.

Figure 2:
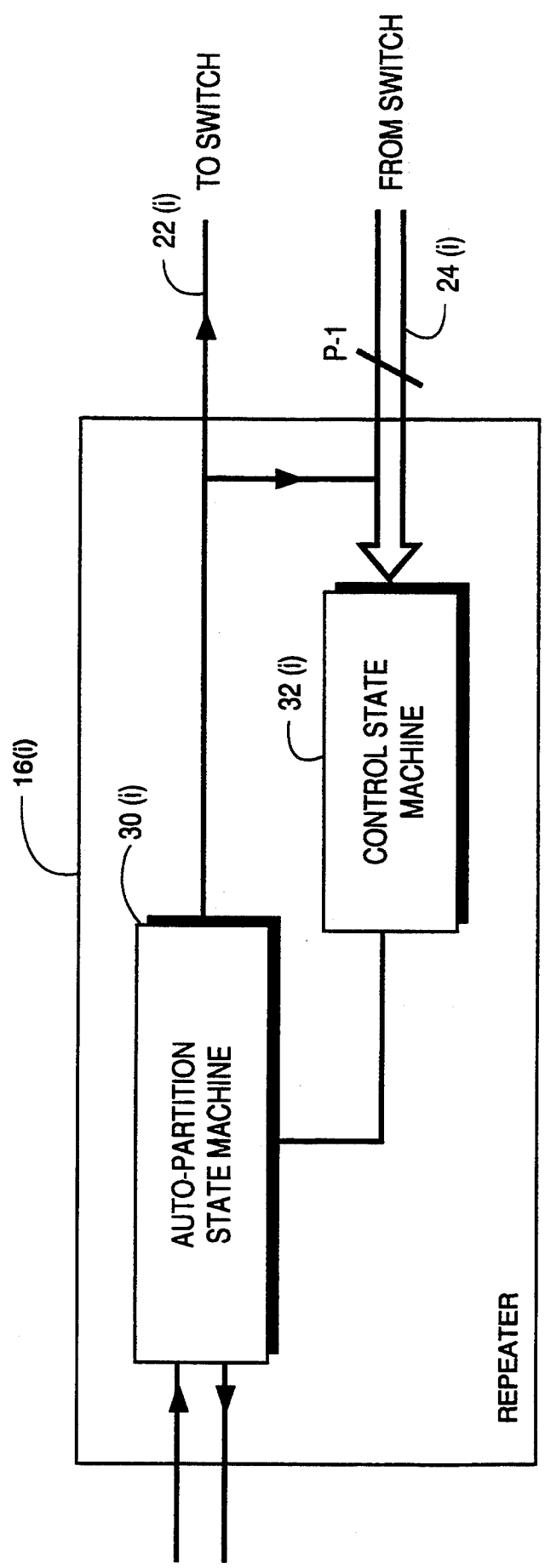
FIG. 2 is a block diagram of the repeater elements shown in FIG. 1.

Referring to FIG. 2, each repeater 16(i) includes an auto-partition state machine 30(i) and a control state machine 32(i). The functionality that is implemented by these two circuits is specified by the relevant protocol (i.e., IEEE 802.3).

In general, auto-partition state machine 30(i) determines whether the connected DTE is complying with the ethernet protocol and it gathers relevant statistics on the traffic through the interface circuit. If the station does not comply with the ethernet protocol, state machine 30(i) does not permit the station signal onto the network, i.e., it blocks the signal from going to switch 18. In this way, each auto-partition state machine 30(i) protects the network from some fault conditions that would tend to halt all network communication, such as a cable break or a faulty or missing termination. If the DTE connection actually represents another segment on which there are multiple DTE's, auto-partition state machine 30(i) also prevents a faulty segment's collision activity from propagating through the network, and, on detection of the malfunction being cleared, an auto-reconnection function implemented by state machine 30(i) reconnects the segment to the network. In this latter case, the auto-partition algorithm isolates a segment from the network when the consecutive number of collisions exceeds a threshold and when a single collision duration exceeds a preselected time. When a segment is partitioned, the auto-partition function isolates the port so that no activity on that port will affect the repeater unit. It does, however, not block valid output from the repeater unit to the DTE.

Assuming the DTE connection is operating properly, auto-partition state machine 30(i) simply passes the Manchester-encoded signal from DTE 12(i) on to switch 18 over input line 22(i). That is, auto-partition state machine 30(i) outputs a single signal on a single line. On the other hand, if the DTE signal had been in some other form, e.g. a differential signal over two lines, auto-partition state machine 30(i) would preferably decode that to a single line signal such as a conventional Manchester-encoded signal. It is possible, of course, to simply send the double line signal to switch 18, but that would require two lines on switch 18 for each port rather than one. In that case, the switch could only handle one half the number of ports that could be handled if a single line Manchester-encoded signal is used.

In the described embodiment, each control state machine 32(i) watches signals from switch 18 over the P-1 output lines 24(i). Based on the signals appearing on those P-1 output lines 24(i) plus the signal sent to switch 18 by that repeater 16(i) over input line 22(i), the control state machine determines whether a collision has occurred. It can do this by simply OR'ing the signals together and looking for a Manchester violation, i.e., a signal which is not a proper Manchester coded signal. The presence of a Manchester violation in the OR'd signal indicates a collision has occurred, i.e., the signal is the combination of two or more Manchester coded signals from the switch. A Manchester violation is detected, the control state machine generates a jam signal which it sends to the connected ethernet station. Since the control state machine is replicated on every port circuit, all control state machines 32(i) will generate a jam signal. In response, the two or more stations that have attempted to send data over the medium back off a random amount of time and retry their transmission in accordance with the protocol. The other stations will be aware that the medium is in use and will not attempt to send data until it is again free for use by others.

Figure 3:
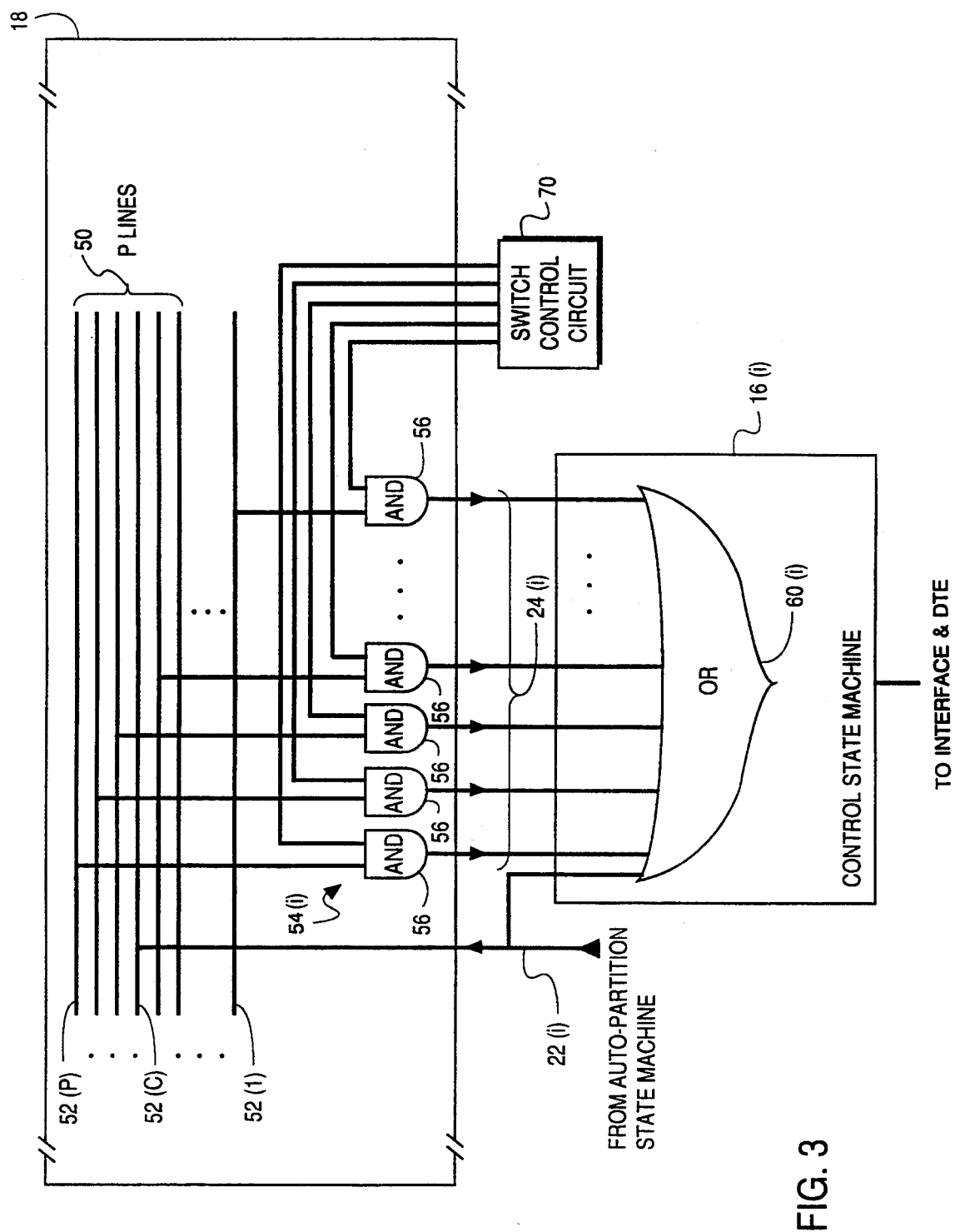
FIG. 3 is a schematic diagram of a portion of the switching fabric and the OR'ing circuit implemented within a repeater of FIG. 1.

FIG. 3 is a functional representation of switch 18 and also shows the OR'ing circuit within a repeater. As indicated, switch 18 includes a backplane 50 having at least P signal lines 52(1)-52(P). P is greater or equal to N the number of ports to which DTE's can be connected. Each auto-partition state machine 30(i) of the corresponding repeater 16(i) sends its output signal over an input line 22(i) to a corresponding different signal line 52(i) on backplane 50. Thus, any given signal line 52(i) on backplane 50 receives a signal from no more than one port. For each port, there is also a switching element 54(i), shown here as an array of P-1 AND gates 56, each having one of its two input lines connected to a different one of the signal lines 52(1)-52(P) on backplane 50 that carries a signal from another port. In the described embodiment, the signal line 52(i) on backplane 50 that receives its signal from that port is not connected to the array of AND gates 56.

The other input line of each of the P-1 AND gates 56 is a control line 58 that determines whether the AND gate is ON or OFF, i.e., whether the attached repeater at that switch output port receives or does not receive a signal from the corresponding signal line 52(i) of backplane 50. A switch control circuit 70, which may be remotely programmed and controlled by a network manager, establishes the configuration of each switching element 54(i), i.e., which signal lines 52(1)-52(P) are selected/deselected.

By controlling the switch element for each port, it is therefore possible to determine which ports form a given network. In addition, as should be apparent from the above description, it is also possible to set up more than one network, each network made up of a different set of ports in the hub.

From the signals appearing on all of the lines, each repeater 16(i) on a particular network configured by the switching fabric determines whether a collision has occurred. In the described embodiment, each repeater includes an OR'ing circuit 60(i) that simply OR's all of the incoming signals from an output port of switch 18 together. Since the signals sent over the backplane are Manchester-encoded signals, a collision can be detected by repeater 16(i) by the occurrence of a Manchester violation, i.e., a signal which does not have the form of a Manchester-encoded signal. If repeater 16(i) detects a Manchester violation, it sends a jam signal to its DTE. Otherwise, it simply passes the received signal, which represents the transmission of a single DTE, to its DTE.

Though the OR'ing circuits have been depicted as part of the repeaters, they could just as easily be depicted as part of the hub switch, as shown in another embodiment described below.

The invention described herein enables one to significantly expand the usefulness of the matrix switch technology that is currently in use within commercially available intelligent hubs such as the Series 7700 family of Intelligent Switching System available from Bytex Corporation of Marlboro Massachusetts. For a further description of the use of a matrix switch technology to token ring networks also see U.S. patent application Ser. No. 07/829,119, entitled "A Matrix Switch for a Network Management System" filed on Jan. 31, 1992, and incorporated herein by reference. In addition to token ring networks, a matrix switch can now be effectively used to simultaneously support and reconfigure both token ring networks and ethernet networks (and other CSMA networks).

Figure 4:
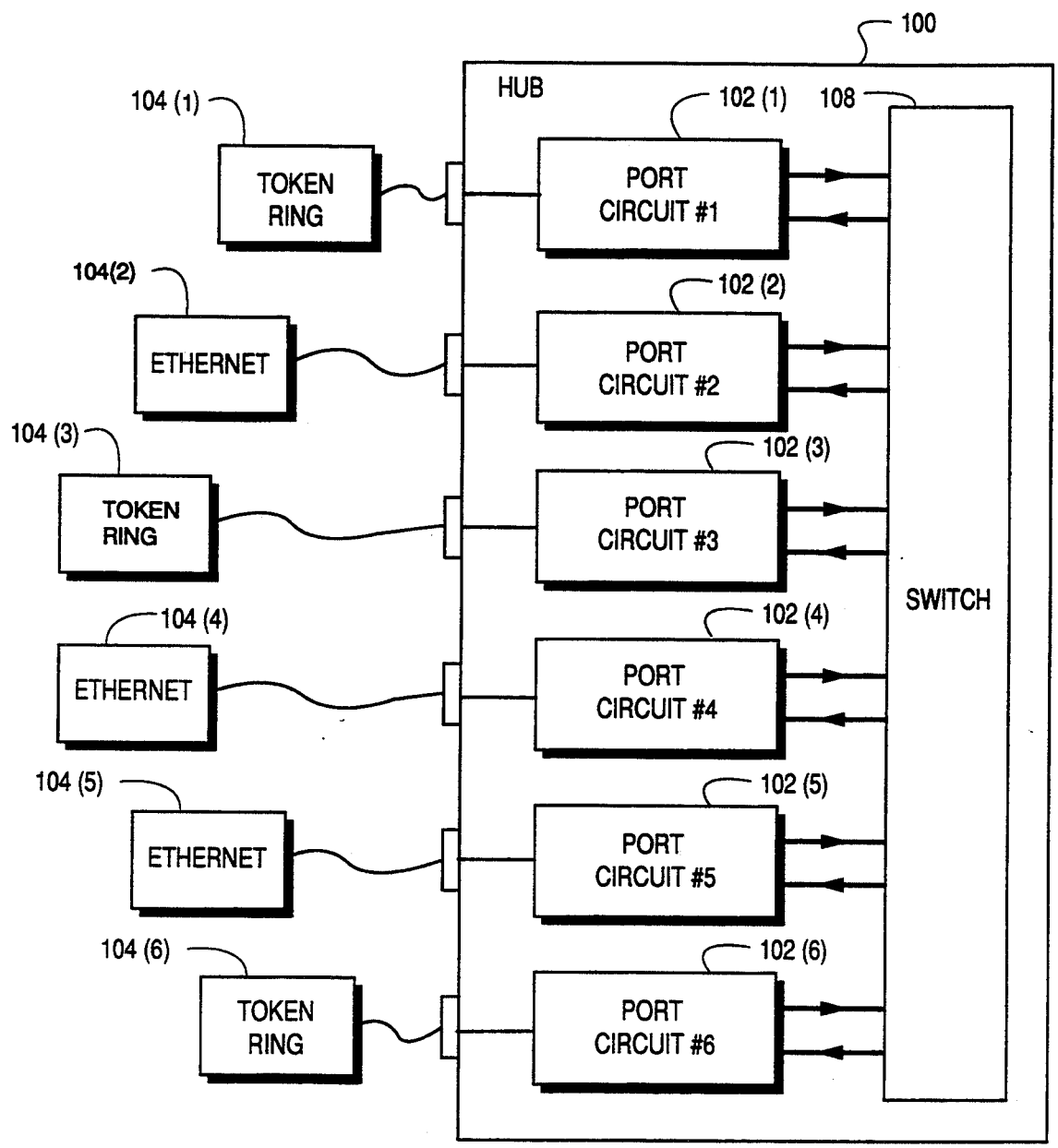
FIG. 4 is a block diagram of a switching hub that supports both ethernet and token ring networks.

FIG. 4 shows a schematic representation of a programmable switching hub 100 that simultaneously supports both token ring and ethernet networks. Programmable hub 100 has six port circuits 102(1)-102(6). Six DTE's 104(1)-104(6), three of which are ethernet stations 104(2), 104(4) and 104(5) and three of which are token ring stations 104(1), 104(3) and 104(6), are connected to port circuits 102(i) of hub 100, each to a different port circuit. Each port circuit 102(i) is, in turn, connected to a switching mechanism 108 that embodies the switching technology previously described. Switching mechanism 108 can be programmably controlled by a network manager at a remote location.

Figure 5:
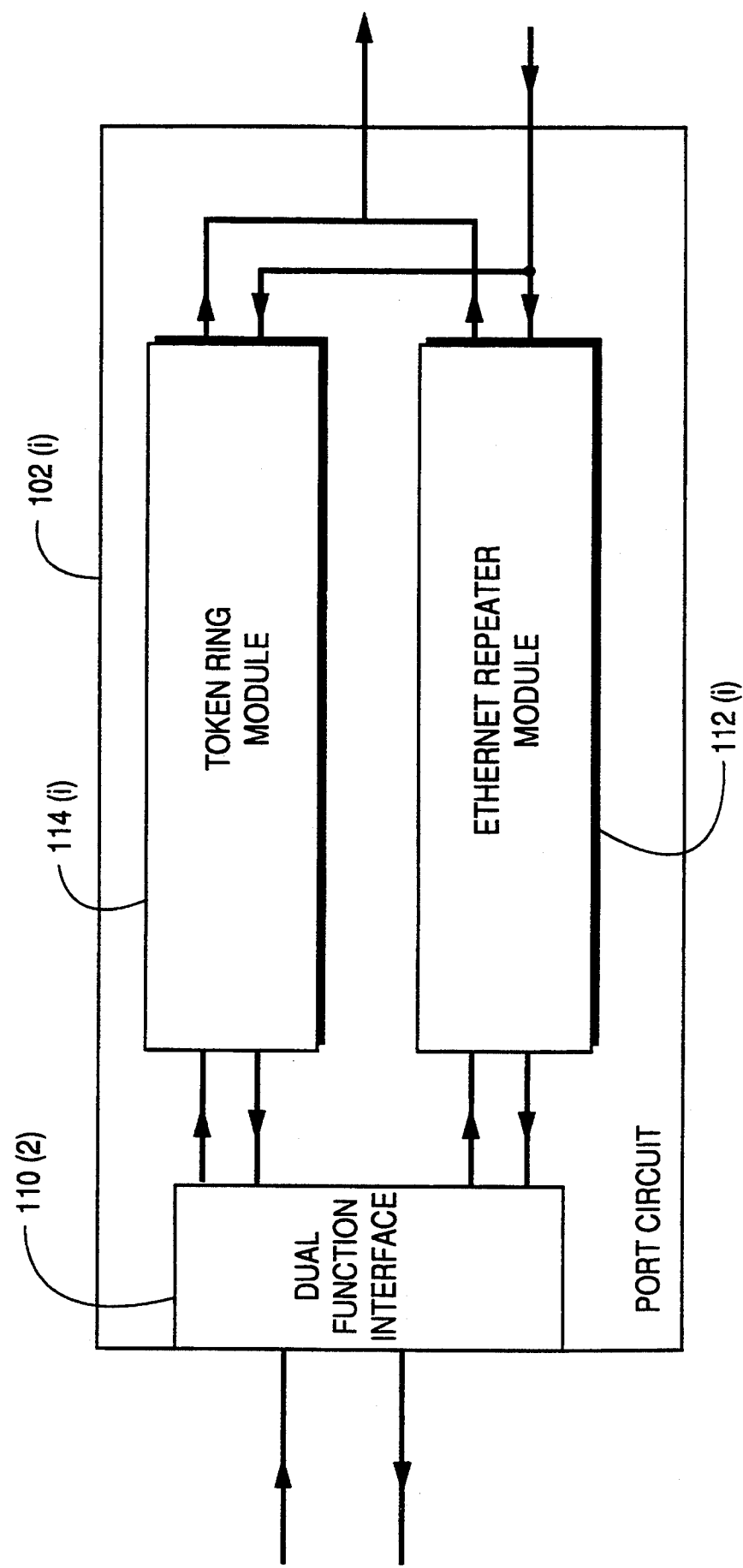
FIG. 5 is a block diagram of the port circuits within the hub shown in FIG. 4.

Shown in greater detail in FIG. 5, each port circuit 102(i) includes a dual function interface 110(i) that complies with the filter, equalizer and other front end requirements of both the Ethernet (IEEE 802.3) and the token ring (IEEE 820.5) standards. Designing such an interface is can be easily done by a person of ordinary skill in the art having a familiarity with the relevant specifications and well understood analog filter/equalizer design methodology. Such interfaces can also be obtained commercially from, for example, Pulse Engineering of California (see their Combo 6.0 product).

Each port circuit 102(i) also includes a repeater module 112(i) for handling Ethernet communications and a token ring module 114(i) for handling token ring communications. Interface 110(i) detects which protocol is being used by the connecting station and directs the incoming signals from the station to the appropriate one of modules 112(i) or 114(i).

Figure 6:
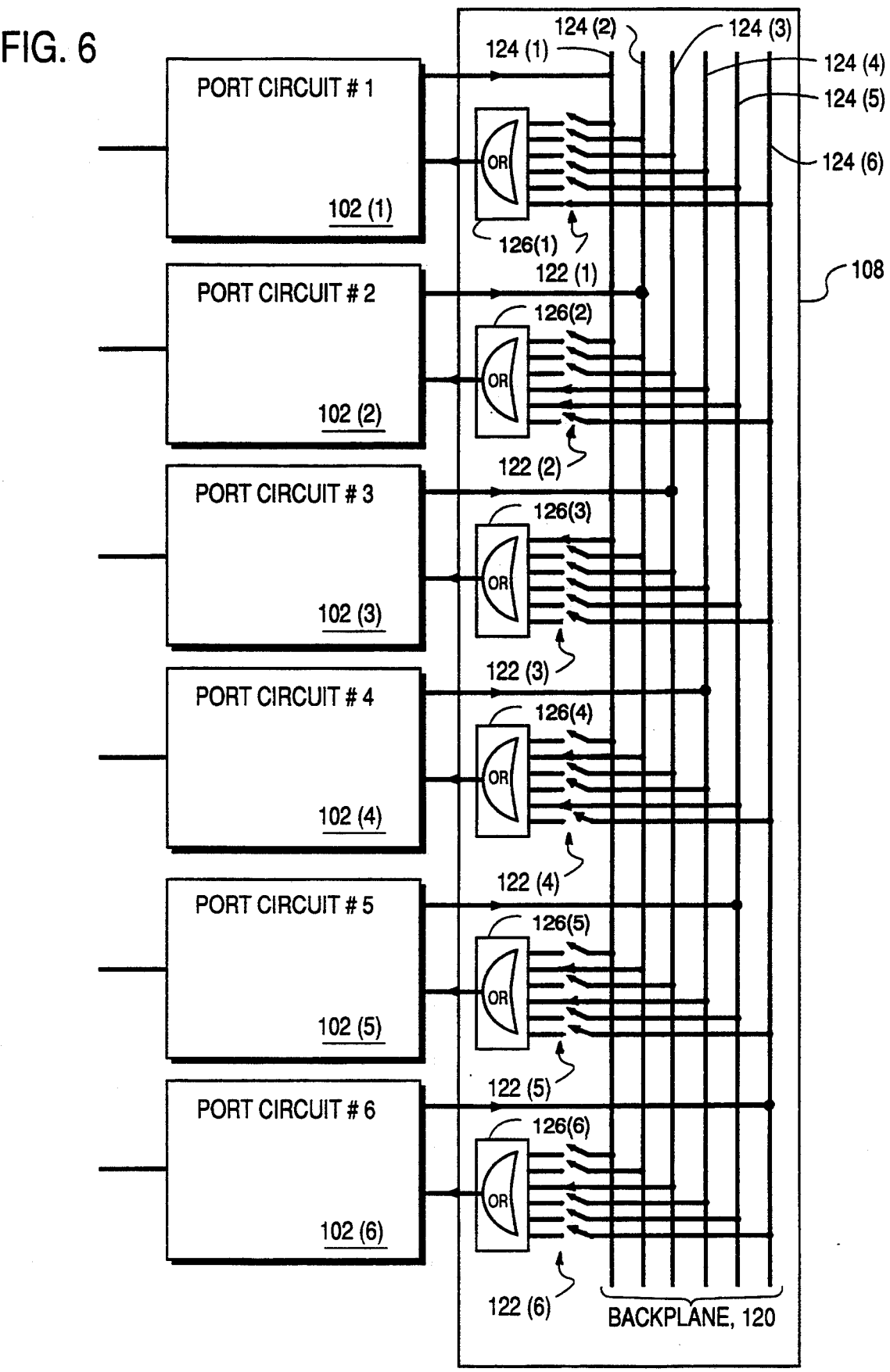
FIG. 6 is a block diagram of the switching mechanism implemented in the switching hub of FIG. 4.

Referring to FIG. 6, switching mechanism 108 includes a backplane 120 and a switching array 122 for each port circuit 102(i). In the described embodiment, backplane 120 has six signal lines 124(1)-124(6), each of which receives a signal from a different port circuit 102(i). Each switching array 122(i) is connected to all of signal lines 124(1)-124(6) on backplane 120 and selects which one or more of those signal lines will provide a signal to its connected port circuit 102(i). For a token ring connection, switching array 122(i) selects only one signal line 124(i) as the source of the signal for the port circuit, namely, the signal line carrying the signal from the upstream station on the ring. For an ethernet connection, switching array 122(i) selects all of the lines carrying signals from other stations on that ethernet network. Within each switching array 122(i), an OR'ing circuit 126(i) combines the signals from all of the signal lines selected by switching array 122(i) and sends the combined signal to the attached port circuit.

In the token ring network, since each switching array 122(i) selects only one signal line, the OR'ing function simply passes the selected signal to the port circuit. In the ethernet network, including more than two stations as shown, the switching array 122(i) selects the signal lines on backplane 120 carrying signals from the other stations making up that ethernet network. In the case of the ethernet network, if two or more stations are attempting to gain control over the network, then more than one signal line 124(i) on backplane 120 will be carrying a signal. The relevant OR'ing circuit 126(i) combines these multiple selected signals to create a combined signal that indicates that a collision has occurred (i.e., the combined signal produces a Manchester violation). During the period when one station has gained control of the ethernet network and is sending data, only one of the backplane signal lines 124(i) which form that ethernet network will be active, and that single signal will be passed to the attached port circuit 102(i).

In this example, switching mechanism 108 forms one network including the three ethernet stations 104(2), 104(4) and 104(5) and it forms another network including the three token ring stations 104(1), 104(3) and 104(6) in that order. As shown, each port circuit 102(i) passes its output signal (i.e., the signal from the attached station) to a corresponding one of signal lines 124(i) of backplane 120. Each switching array 122(i) selects the appropriate signal line or lines of backplane 120 over which to receive signals from other stations for its attached port circuit 102(i). For the ethernet network, switching array 122(2) selects signal lines 124(4) and 124(5), switching array 122(4) selects signal lines 124(2) and 124(5); and switching array 122(5) selects signal lines 124(2) and 124(4). For the token ring network, switching array 122(1) selects signal line 124(6), switching array 122(3) selects signal line 124(1) and switching array 122(6) selects signal line 124(3).

As should be readily appreciated, by simply reconfiguring the individual switching arrays 122(i) of switching mechanism 108 (which may be done under program control from a remote location by a network manager), it is a simple matter to change the number of stations connected to either network, to alter the order of the stations in the token ring network, or to move one port from one type network to a network of another type.

Other embodiments are within the following claims. For example, rather than using an OR'ing function to combine the signals from the switch and testing for a Manchester violation on the combined signal as described above, one could look at the activity on each individual line using an activity detector on each line. If more than one line is reported as being active, a collision will be declared and the appropriate action taken. If only one line is active, the signal would be passed on to the port interface for transmission to the DTE's on the attached segment.

What is claimed is:

1. An apparatus for interconnecting a plurality of network segments each of which operates in accordance with a bus protocol specifying collision detection and propagation operations, said apparatus comprising:
   a switching mechanism including a backplane having P signal paths and including P switch ports each with an input and an output, the input of each switch port connected to a different one of said P signal paths, said switching mechanism electrically connecting at each switch port a selectable one or more of said P signal paths to the output for that switch port, and wherein each of said P signal paths carries a single signal;
   a plurality of port circuits each connected to a different one of the ports of said switching mechanism, each port circuit having an output connected to the input of the port to which it is connected and each having an input connected to the output of the port to which it is connected, wherein each port circuit comprises:
   an interface to which one of said plurality of segments is connected and through which that port circuit receives a data signal from and transmits a data signal to the attached segment;
   an auto-partition state machine connected to the interface for that port circuit receiving the data signal from the segment connected to that port circuit's interface and generating therefrom a single output signal on the output line of that port circuit, said auto-partition state machine performing partitioning functions for that port circuit's segment; and
   a control state machine receiving a signal over the input for that port circuit and using that signal to implement the collision detection and propagation operations of said bus protocol for the segment connected to that port circuit.

2. The apparatus of claims 1 wherein for each port circuit the data signals received from and transmitted to the attached segment are Manchester-encoded signals.

3. The apparatus of claim 2 wherein the single output signal generated by each auto-partition state machine is a single line signal.

4. The apparatus of claim 3 wherein the single output signal generated by each auto-partition state machine is a Manchester-encoded signal.

5. The apparatus of claim 1 wherein said switching mechanism further comprises a combiner circuit for each switch port, said combiner circuits combining all signals received over the signal paths that are electrically connected to the output of the associated switch port.

6. The apparatus of claim 5 wherein said combiner circuits perform an OR'ing function on all signals received over the signal paths that are electrically connected to the output of the associated switch port.

7. The apparatus of claim 6 wherein the output signal generated by each auto-partition state machine is a Manchester-encoded signal and wherein each control state machine detects the occurrence of a collision by checking for a Manchester violation in the OR'd signal from the combiner circuit for that switch port.

8. The apparatus of claim 1 wherein the bus protocol is a Carrier Sense Multiple Access (CSMA) protocol and wherein the control state machines implement the collision detection and propagation algorithms of the CSMA protocol.

9. The apparatus of claim 8 wherein the bus protocol is defined by the IEEE 802.3 specification and wherein each of the auto-partition state machines implements the auto-partition functions of the IEEE 802.3 specification.

10. The apparatus of claim 1 wherein each of said P signal paths is a single line on said backplane.

11. The apparatus of claim 1 wherein the output of each switch port comprises a plurality of output signal lines each for carrying a different switch selected signal and wherein the control state machine in each port circuit comprises a plurality of activity detectors each monitoring a different one of said plurality of signal output lines of the switch output to which that port circuit is connected, each of said activity detectors indicating whether a signal is present on the associated signal output line for that switch port.

12. The apparatus of claim 11 wherein the control state machine in each port circuit implements the collision propagation algorithm of the CSMA if more than one activity detector in that control state machine indicates an active signal line.

13. The apparatus of claim 11 wherein the control state machine in each port circuit generates a jam signal if more than one activity detector in that control state machine indicates an active signal line.

14. The apparatus of claim 1 wherein the interface of each port circuit performs filtering and equalization for the data signals received from and sent to the attached segment.

15. An apparatus for interconnecting a plurality of segments each of which operates in accordance with either a bus protocol specifying collision detection and propagation operations or a ring protocol, said apparatus comprising:
   a switching mechanism including a backplane having P signal paths and including P switch ports, each with an input and an output, the input of each switch port connected to a different one of said P signal paths, said switching mechanism electrically connecting at each switch port a selectable one or more of said P signal paths to the output for that switch port, and wherein each of said P signal paths carries a single signal;

a plurality of dual function port circuits for connecting a segment to the switching mechanism, each of said dual function ports connected to a different one of the ports of said switching mechanism, each dual function port circuit having an output connected to the input of the switch port to which it is connected and each having an input connected to the output of the switch port to which it is connected, wherein each of said dual function port circuits implements the functionality of either the bus protocol or the ring protocol depending upon which type of segment is connected to that dual function port circuit, wherein for any given switch port on said switching mechanism, said switching mechanism connects only one of said P signal paths to the output of that switch port if the dual function port circuit connected thereto is implementing the functionality of the ring protocol and said switching mechanism connects more than one of said P signal paths to the output of that switch port if the dual function port circuit connected thereto is implementing the functionality of the bus protocol.

* * * * *

UNITED STATES PATENT AND TRADEMARK OFFICE
CERTIFICATE OF CORRECTION

PATENT NO. : 5,345,447

DATED : September 6, 1994

INVENTOR(S) : Chris R. Noel

It is certified that error appears in the above-identified patent and that said Letters Patent is hereby corrected as shown below:

Col. 6, line 42, "A" should read --If a--.

Signed and Sealed this

Twenty-third Day of January, 1996

Attest:

BRUCE LEHMAN

Attesting Officer

Commissioner of Patents and Trademarks